(12) United States Patent
Kojima

(10) Patent No.: US 7,394,644 B2
(45) Date of Patent: Jul. 1, 2008

(54) LAMINATED CERAMIC CAPACITOR AND MANUFACTURING METHOD THEREFOR

(75) Inventor: Tatsuya Kojima, Tokyo (JP)

(73) Assignee: TDK Corporation, Tokyo (JP)

( * ) Notice: Subject to any disclaimer, the term of this patent is extended or adjusted under 35 U.S.C. 154(b) by 139 days.

(21) Appl. No.: 11/406,352

(22) Filed: Apr. 19, 2006

(65) Prior Publication Data

US 2006/0256504 A1    Nov. 16, 2006

(30) Foreign Application Priority Data

May 25, 2005    (JP) .............................. 2005-152955

(51) Int. Cl.
*H01G 4/005*    (2006.01)
*H01G 4/06*    (2006.01)

(52) U.S. Cl. ....................... 361/303; 361/311; 29/25.42

(58) Field of Classification Search ......... 361/303–305, 361/311–312, 306.1, 306.2, 306.3, 309
See application file for complete search history.

(56) References Cited

U.S. PATENT DOCUMENTS 4,297,773 A * 11/1981 Galvagni .................... 29/25.42

FOREIGN PATENT DOCUMENTS

| JP | 02-192707 | 7/1990 |
|---|---|---|
| JP | 08-316093 | 11/1996 |
| JP | 09-260193 | 10/1997 |
| JP | 11-162781 | 6/1999 |
| JP | 2001-155959 | 6/2001 |
| JP | 2001-358036 | 12/2001 |

OTHER PUBLICATIONS

U.S. Appl. No. 11/374,041, filed Mar. 14, 2006, Tonogai, et al.
U.S. Appl. No. 11/346,288, filed Feb. 3, 2006, Kojima, et al.
U.S. Appl. No. 11/491,282, filed Jul. 24, 2006, Tonogai et al.

* cited by examiner

*Primary Examiner*—Eric Thomas
(74) *Attorney, Agent, or Firm*—Oblon, Spivak, McClelland, Maier & Neustadt, P.C.

(57) ABSTRACT

A laminated ceramic capacitor includes a ceramic substrate and a plurality of internal electrodes. The ceramic substrate is of a shape defined by length, width and thickness directions. The internal electrodes are stacked one over another within the ceramic substrate at spaced intervals in the thickness direction and alternately led out to opposite ends of the ceramic substrate in the length direction. The ceramic substrate has opposite surfaces in the thickness direction, one of which is planar. In the laminated ceramic capacitor, $1 < Db/Da \leqq 2.1$, where Da represents a distance between the planar surface and an outermost internal electrode at a center between the opposite ends of the ceramic substrate, and Db represents a distance between the planar surface and the outermost internal electrode at one of the opposite ends of the ceramic substrate.

2 Claims, 5 Drawing Sheets

LAMINATED CERAMIC CAPACITOR AND MANUFACTURING METHOD THEREFOR

BACKGROUND OF THE INVENTION

1. Field of the Invention

The present invention relates to a laminated ceramic capacitor and a manufacturing method therefor.

2. Description of the Related Art

Generally, laminated ceramic capacitors are constructed such that a plurality of internal electrodes are stacked one over another with ceramic layers interposed therebetween and alternately led out to opposite ends of a ceramic substrate. Such a laminated ceramic capacitor has steps due to the presence or absence of the internal electrode between the ends and the center of the ceramic substrate, i.e., between the location where the internal electrodes and spaces alternate with each other in the direction of lamination and the location where the internal electrodes are stacked one over another without the spaces. The steps invite dimensional distortion of the ceramic substrate, which contributes to improper mounting of the laminated ceramic capacitor.

As means for solving the problem of steps, Japanese Patent Application Publication No. 2001-358036 discloses a technology of printing a ceramic paste around the internal electrodes for absorbing the steps.

However, the ceramic paste for absorbing the steps has to be printed around the internal electrodes in a precise pattern, which requires high-precision printing. Adding such an operation complicates the manufacturing process.

In addition, printing the ceramic paste around the internal electrodes for absorbing the steps tends to cause a problem of sheet attack. That is, there is a possibility that a solvent of the ceramic paste will penetrate in between a green sheet and a polyethylene terephthalate (PET) film to cause separation of the green sheet from the PET film.

SUMMARY OF THE INVENTION

It is an object of the present invention to provide a laminated ceramic capacitor which is capable of minimizing dimensional distortion of a ceramic substrate so as to prevent improper mounting, simplifying its manufacturing process, and preventing the problem of sheet attack, and a method for manufacturing the same.

[Laminated Ceramic Capacitor]

According to a first aspect of the present invention, there is provided a laminated ceramic capacitor comprising a ceramic substrate being of a shape defined by length, width and thickness directions, and a plurality of internal electrodes stacked one over another within the ceramic substrate at spaced intervals in the thickness direction and alternately led out to opposite ends of the ceramic substrate in the length direction, the ceramic substrate having opposite surfaces in the thickness direction, one of which is planar, wherein $1 < Db/Da \leqq 2.1$ where Da represents a distance between the planar surface and an outermost internal electrode at a center between the opposite ends of the ceramic substrate, and Db represents a distance between the planar surface and the outermost internal electrode at one of the opposite ends of the ceramic substrate.

In the laminated ceramic capacitor according to the first aspect of the present invention, a plurality of internal electrodes are stacked one over another within a ceramic substrate at spaced intervals in a thickness direction and alternately led out to opposite ends of the ceramic substrate in a length direction. This provides the basic structure of the laminated ceramic capacitor.

Moreover, one of opposite surfaces of the ceramic substrate in the thickness direction is planar and a distance Db between the planar surface and an outermost internal electrode at one of the opposite ends of the ceramic substrate is set greater than a distance Da between the planar surface and the outermost internal electrode at a center between the opposite ends of the ceramic substrate. This construction can absorb steps which otherwise would be created between the ends and the center of the ceramic substrate, minimizing dimensional distortion of the ceramic substrate. This further prevents improper mounting of the laminated ceramic capacitor.

With this construction, furthermore, it becomes unnecessary to provide the process of printing a ceramic paste around the internal electrodes for absorbing steps in the manufacturing process of the laminated ceramic capacitor. Therefore, the manufacturing process of the laminated ceramic capacitor can be simplified.

Because it is made unnecessary to provide the process of printing a ceramic paste around the internal electrodes for absorbing steps, the problem of sheet attack can also be prevented.

Also in the laminated ceramic capacitor, the ratio Db/Da is set equal to or less than 2.1. With the ratio Db/Da being set equal to or less than 2.1, the occurrence ratios of improper mounting and delamination in the laminated ceramic capacitor can be kept at a low level.

[Method for Manufacturing Laminated Ceramic Capacitor]

According to a second aspect of the present invention, there is provided a method for manufacturing a laminated ceramic capacitor, comprising forming a first ceramic green sheet having a plurality of internal electrode layers on one surface thereof with spaces between the internal electrode layers, forming a second ceramic green sheet without any internal electrode layer, the second ceramic green sheet having a step absorbing layer on one surface thereof, and forming a sheet stack with at least one second ceramic green sheet disposed outside a plurality of the first ceramic green sheets such that the step absorbing layer is at locations where the internal electrode layers and the spaces alternate with each other in a direction of lamination.

In the laminated ceramic capacitor manufacturing method according to the second aspect of the present invention, a plurality of internal electrode layers are formed on one surface of a first ceramic green sheet with spaces therebetween and a plurality of the first ceramic green sheets are stacked into a sheet stack. This provides the basic structure of the laminated ceramic capacitor.

In the second aspect of the present invention, the improvement resides in that a second ceramic green sheet is formed with a step absorbing layer on one surface thereof but not formed with any internal electrode layer and a sheet stack is formed with at least one second ceramic green sheet disposed outside the plurality of first ceramic green sheets such that the step absorbing layer is at locations where the internal electrode layers and the spaces alternate with each other in a direction of lamination. This step absorbing structure can absorb steps which otherwise would be created between the locations where the internal electrode layers and spaces alternate with each other in the direction of lamination and the location where the internal electrode layers are stacked one over another without the spaces in the direction of lamination, minimizing dimensional distortion of a ceramic substrate that can be obtained by cutting the sheet stack. This further prevents improper mounting of the laminated ceramic capacitor.

Moreover, the step absorbing structure makes it unnecessary to provide the process of printing a ceramic paste around the internal electrode layers on the first ceramic green sheet for absorbing steps. Therefore, the manufacturing process of the laminated ceramic capacitor can be simplified.

Because it is made unnecessary to provide the process of printing a ceramic paste around the internal electrode layers on the first ceramic green sheet for absorbing steps, the problem of sheet attack can also be prevented.

As has been described hereinabove, the present invention provides a laminated ceramic capacitor which is capable of minimizing dimensional distortion of a ceramic substrate so as to prevent improper mounting, simplifying its manufacturing process, and preventing the problem of sheet attack, and a method for manufacturing the same.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

[Laminated Ceramic Capacitor]

Figure 1:
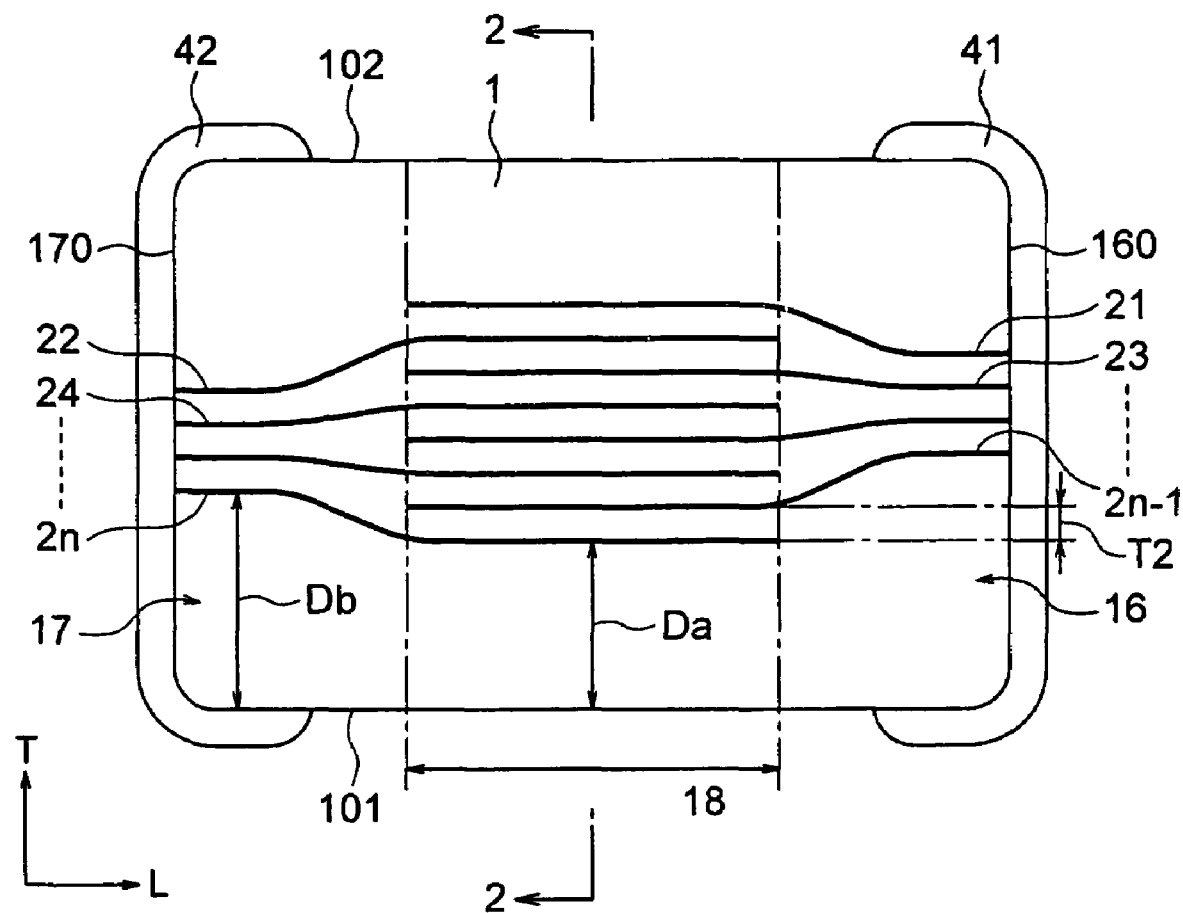
FIG. 1 is a longitudinal sectional view of a laminated ceramic capacitor according to one embodiment of the present invention.
Figure 2:
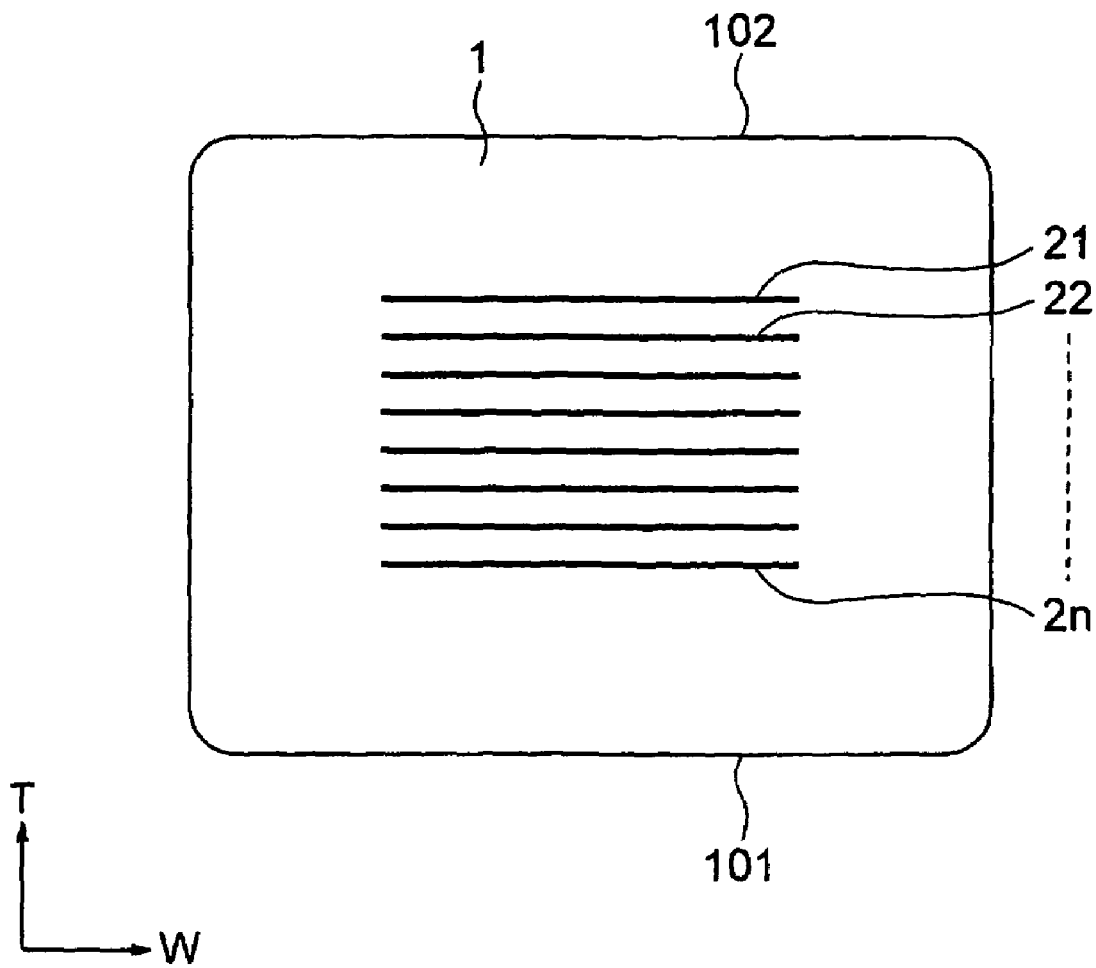
FIG. 2 is a transverse sectional view taken along line 2-2 of FIG. 1.

Referring to FIGS. 1 and 2, a laminated ceramic capacitor includes a ceramic substrate 1 and a plurality of internal electrodes 21 to 2n.

For example, the ceramic substrate 1 may be made of a dielectric material containing barium titanate as a main component. The ceramic substrate 1 is of a shape defined by a length direction L, a width direction W and a thickness direction T. Specifically, the ceramic substrate 1 is a generally rectangular solid with the length direction L, the width direction W and the thickness direction T. In the ceramic substrate 1, for example, the dimensions—length, width and thickness—are respectively 3.2 mm, 1.6 mm and 1.6 mm.

At opposite end surfaces 160, 170 of the ceramic substrate 1 in the length direction L, there are provided terminal electrodes 41, 42. For example, the terminal electrodes 41, 42 may be a multilayer structure with an exterior layer containing Sn as a main component, an intermediate layer containing Ni as a main component, and a base layer containing Cu as a main component.

The internal electrodes 21 to 2n are stacked one over another within the ceramic substrate 1 at spaced intervals in the thickness direction T. In detail, the individual internal electrodes 21 to 2n are of a rectangular shape with the length direction L and the width direction W, as viewed on a plane perpendicular to the thickness direction T. The internal electrodes 21 to 2n are stacked one over another with dielectric layers therebetween.

In addition, the internal electrodes 21 to 2n are alternately led out to opposite end portions 16, 17 of the ceramic substrate 1 in the length direction L. First, one end of the internal electrode 21 in the length direction L is led out to the end surface 160 of the ceramic substrate 1 and connected to the terminal electrode 41, while the other end in the length direction L is spaced from the end surface 170 of the ceramic substrate 1 in the length direction L. Second, one end of the internal electrode 22 in the length direction L is spaced from the end surface 160 of the ceramic substrate 1 in the length direction L, while the other end in the length direction L is led out to the end surface 170 of the ceramic substrate 1 and connected to the terminal electrode 42. The other internal electrodes 23 to 2n are likewise disposed. With the internal electrodes being led out in the manner described, the internal electrodes alternate with spaces (which will be described in detail hereinafter) in the thickness direction (or lamination direction) T at the opposite end portions 16, 17 of the ceramic substrate 1 in the length direction L. At a center portion 18 of the ceramic substrate 1 in the length direction L, on the other hand, the internal electrodes are stacked one over another without the spaces in the lamination direction T.

For example, the internal electrodes 21 to 2n may be made of Ni or Cu. The layer thickness T1 of the individual internal electrode 21 to 2n and the number of the internal electrodes 21 to 2n may be arbitrarily set. The layer thickness T2 (see FIG. 1) of the individual dielectric layers interposed between the internal electrodes at the center portion 18 of the ceramic substrate 1 may also be arbitrarily set. For example, the number of the internal electrodes may be 400, the layer thickness T1 of the individual internal electrodes may be 1.0 µm, and the layer thickness T2 of the individual dielectric layers may be 1.0 µm.

The ceramic substrate 1 and the internal electrodes 21 to 2n are basically constructed as described above. Now the characteristic features of the laminated ceramic capacitor will be described.

The ceramic substrate 1 has opposite surfaces 101, 102 in the thickness direction T, of which the surface 101 is planar. As used herein, the term "planar" means that the surface is sufficiently flat to not cause improper mounting of the laminated ceramic capacitor.

In the ceramic substrate 1, the distance Db measured between the surface 101 and the outermost internal electrode 2n at the end portion 17 is set greater than the distance Da measured between the surface 101 and the outermost internal electrode 2n at the center portion 18. At the center portion 18, specifically, the internal electrode 2n maintains an almost constant distance from the surface 101 in the thickness direction T. At the end portion 17, the internal electrode 2n is at a higher level in the thickness direction T than at the center portion 18. The distance Db is measured at the end surface 170 or the vicinity thereof.

The ratio of Db to Da, i.e., Db/Da is equal to or less than 2.1. Thus, the ratio Db/Da satisfies the following relationship:

$$1 < Db/Da \leq 2.1.$$

In the illustrated embodiment, the other surface 102 of the ceramic substrate 1 is also planar and the distance measured between the surface 102 and the outermost internal electrode 21 at the end portion 16 is also set greater than the distance measured between the surface 102 and the outermost internal electrode 21 at the center portion 18. The details are the same as described for the distance from the surface 101 to the internal electrode 2n, and therefore, a duplicate description will be omitted.

In the laminated ceramic capacitor, as has been described above with reference to FIGS. 1 and 2, the internal electrodes 21 to 2n are stacked one over another within the ceramic substrate 1 at spaced intervals in the thickness direction T and alternately led out to the opposite end portions 16, 17 of the ceramic substrate 1 in the length direction L. This provides the basic structure of the laminated ceramic capacitor.

Moreover, the surface 101 being one of the opposite surfaces 101, 102 of the ceramic substrate 1 in the thickness direction T is planar and the distance Db between the surface 101 and the outermost internal electrode 2n at the end portion 17 is set greater than the distance Da between the surface 101 and the outermost internal electrode 2n at the center portion 18. This construction can absorb a step which otherwise would be created between the end portion 17 and the center portion 18 of the ceramic substrate 1, minimizing dimensional distortion of the ceramic substrate 1. This further prevents improper mounting of the laminated ceramic capacitor.

With this construction, furthermore, it becomes unnecessary to provide the process of printing a ceramic paste around the internal electrodes 21 to 2n for absorbing steps in the manufacturing process of the laminated ceramic capacitor. Therefore, the manufacturing process of the laminated ceramic capacitor can be simplified.

Because it is made unnecessary to provide the process of printing a ceramic paste around the internal electrodes 21 to 2n for absorbing steps, the problem of sheet attack can also be prevented.

Also in the laminated ceramic capacitor, the ratio Db/Da is set equal to or less than 2.1. With the ratio Db/Da being set equal to or less than 2.1, the occurrence ratios of improper mounting and delamination in the laminated ceramic capacitor can be kept at a low level.

The benefits of maintaining the above-noted ratio will now be explained by referring to the experimental data in Tables 1 to 4. In Tables 1 to 4, the number of the internal electrodes, the layer thickness T1 of the internal electrode, the layer thickness T2 of the dielectric layer, the ratio T1/T2, the thickness of the exterior, the distance Da, the distance Db, the ratio Db/Da, the barrel distortion, the occurrence ratio of improper mounting, and the occurrence ratio of delamination are described for each sample. The barrel distortion means the degree of deformation of a chip, wherein the higher the number, the larger the deformation and the higher the possibility of occurrence of improper mounting. The occurrence ratio of improper mounting and the occurrence ratio of delamination were measured with 100,000 laminated ceramic capacitors manufactured for each sample.

Firstly, Table 1 shows the experimental data when the distance Da was 200 μm and the layer thickness T1 of the internal electrode was 1.5 μm.

TABLE 1

| Sample No. | Number of Internal Electrodes | Thickness T1 (μm) | Thickness T2 (μm) | T1/T2 | Thickness of Exterior (μm) | Distance Da (μm) | Distance Db (μm) | Db/Da | Barrel Distortion | Occurrence Ratio of Improper Mounting (ppm) | Occurrence Ratio of Delamination (%) |
|---|---|---|---|---|---|---|---|---|---|---|---|
| 1 | 400 | 1.5 | 5.0 | 0.30 | 200 | 200 | 215 | 1.08 | 0 | 0 | 0.0 |
| 2 | 400 | 1.5 | 2.5 | 0.60 | 200 | 200 | 250 | 1.25 | 4 | 20 | 0.1 |
| 3 | 400 | 1.5 | 1.5 | 1.00 | 200 | 200 | 320 | 1.60 | 7 | 20 | 0.2 |
| 4 | 400 | 1.5 | 1.0 | 1.50 | 200 | 200 | 420 | 2.10 | 9 | 30 | 0.3 |
| 5 | 400 | 1.5 | 0.5 | 3.00 | 200 | 200 | 700 | 3.50 | 20 | 3000 | 3.0 |

From Table 1, it is seen that if the ratio Db/Da is equal to or less than 2.10, the occurrence ratio of improper mounting can be held below 50 ppm. The occurrence ratio of delamination can also be held below 0.3%.

On the other hand, if the ratio Db/Da exceeds 2.10, the occurrence ratio of improper mounting exceeds 50 ppm and increases sharply. The occurrence ratio of delamination also exceeds 0.3% and increases sharply. For instance, when the ratio Db/Da was 3.50, the occurrence ratio of improper mounting was 3,000 ppm and the occurrence ratio of delamination was 3.0%.

Secondly, Table 2 shows the experimental data when the distance Da was 200 μm and the layer thickness T1 of the internal electrode was 1.0 μm.

TABLE 2

| Sample No. | Number of Internal Electrodes | Thickness T1 (μm) | Thickness T2 (μm) | T1/T2 | Thickness of Exterior (μm) | Distance Da (μm) | Distance Db (μm) | Db/Da | Barrel Distortion | Occurrence Ratio of Improper Mounting (ppm) | Occurrence Ratio of Delamination (%) |
|---|---|---|---|---|---|---|---|---|---|---|---|
| 6 | 400 | 1.0 | 5.0 | 0.20 | 200 | 200 | 210 | 1.05 | 0 | 0 | 0.0 |
| 7 | 400 | 1.0 | 2.5 | 0.40 | 200 | 200 | 230 | 1.15 | 3 | 0 | 0.0 |
| 8 | 400 | 1.0 | 1.5 | 0.67 | 200 | 200 | 280 | 1.40 | 7 | 20 | 0.1 |
| 9 | 400 | 1.0 | 1.0 | 1.00 | 200 | 200 | 320 | 1.60 | 8 | 30 | 0.2 |
| 10 | 400 | 1.0 | 0.5 | 2.00 | 200 | 200 | 600 | 3.00 | 17 | 800 | 1.2 |

From Table 2, it is seen that if the ratio Db/Da is equal to or less than 2.10, the occurrence ratio of improper mounting can be held below 50 ppm. The occurrence ratio of delamination can also be held below 0.3%.

On the other hand, if the ratio Db/Da exceeds 2.10, the occurrence ratio of improper mounting exceeds 50 ppm and increases sharply. The occurrence ratio of delamination also exceeds 0.3% and increases sharply. For instance, when the ratio Db/Da was 3.00, the occurrence ratio of improper mounting was 800 ppm and the occurrence ratio of delamination was 1.2%.

Thirdly, Table 3 shows the experimental data when the distance Da was 100 μm and the layer thickness T1 of the internal electrode was 1.5 μm.

mounting was 100 ppm and the occurrence ratio of delamination was 0.5%.

From the experimental data of Tables 1 to 4, it will be understood that the upper limit of the ratio Db/Da should be set at 2.10.

On the other hand, the lower limit of the ratio Db/Da is considered as being greater than 1. The distance Db should be greater than the distance Da, because the present invention is premised on printing no ceramic paste around the internal electrodes for absorbing steps.

[Method for Manufacturing Laminated Ceramic Capacitor]

Hereinbelow, a method for manufacturing a laminated ceramic capacitor according to one embodiment of the

TABLE 3

| Sample No. | Number of Internal Electrodes | Thickness T1 (μm) | Thickness T2 (μm) | T1/T2 | Thickness of Exterior (μm) | Distance Da (μm) | Distance Db (μm) | Db/Da | Barrel Distortion | Occurrence Ratio of Improper Mounting (ppm) | Occurrence Ratio of Delamination (%) |
|---|---|---|---|---|---|---|---|---|---|---|---|
| 11 | 400 | 1.5 | 5.0 | 0.30 | 100 | 100 | 120 | 1.20 | 2 | 0 | 0.0 |
| 12 | 400 | 1.5 | 2.5 | 0.60 | 100 | 100 | 160 | 1.60 | 4 | 30 | 0.1 |
| 13 | 400 | 1.5 | 1.5 | 1.00 | 100 | 100 | 240 | 2.40 | 11 | 80 | 0.4 |
| 14 | 400 | 1.5 | 1.0 | 1.50 | 100 | 100 | 350 | 3.50 | 15 | 200 | 0.8 |
| 15 | 400 | 1.5 | 0.5 | 3.00 | 100 | 100 | 650 | 6.50 | 20 | 5000 | 2.5 |

From Table 3, it is seen that if the ratio Db/Da is equal to or less than 2.10, the occurrence ratio of improper mounting can be held below 50 ppm. The occurrence ratio of delamination can also be held below 0.3%.

On the other hand, if the ratio Db/Da exceeds 2.10, the occurrence ratio of improper mounting exceeds 50 ppm and increases sharply. The occurrence ratio of delamination also exceeds 0.3% and increases sharply. For instance, when the ratio Db/Da was 2.40, the occurrence ratio of improper mounting was 80 ppm and the occurrence ratio of delamination was 0.4%.

Finally, Table 4 shows the experimental data when the distance Da was 100 μm and the layer thickness T1 of the internal electrode was 1.0 μm.

present invention will be described. The present embodiment is concerned with a method for manufacturing the laminated ceramic capacitor shown in FIGS. 1 and 2.

Figure 3:
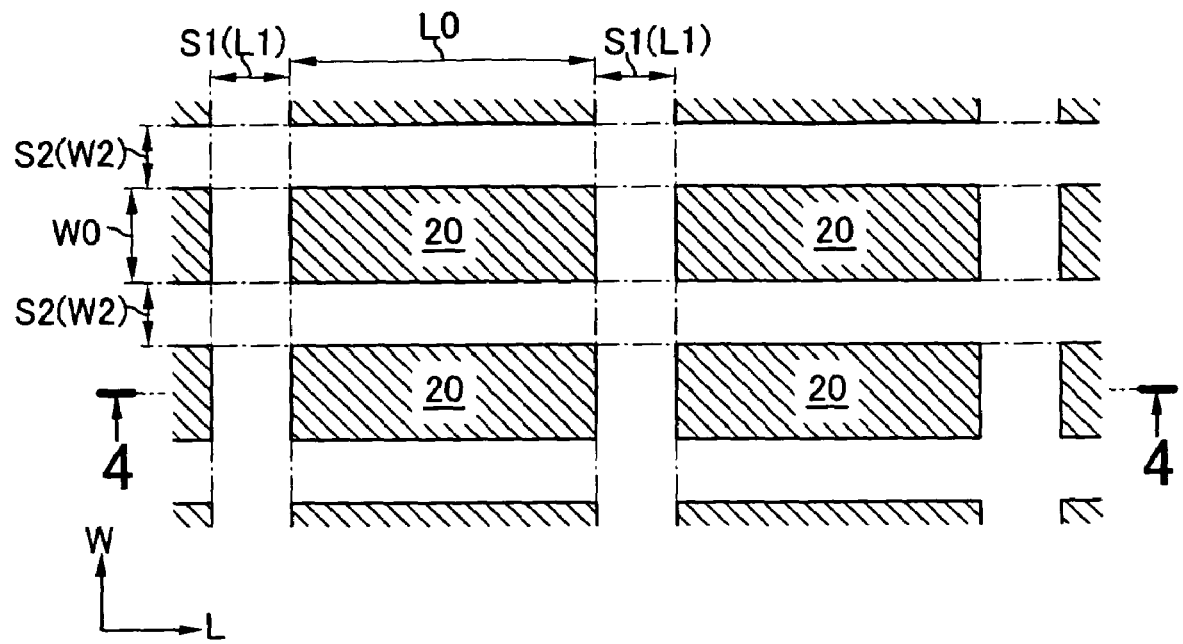
FIG. 3 is a plan view of a first ceramic green sheet employed in a method for manufacturing a laminated ceramic capacitor according to one embodiment of the present invention.
Figure 4:
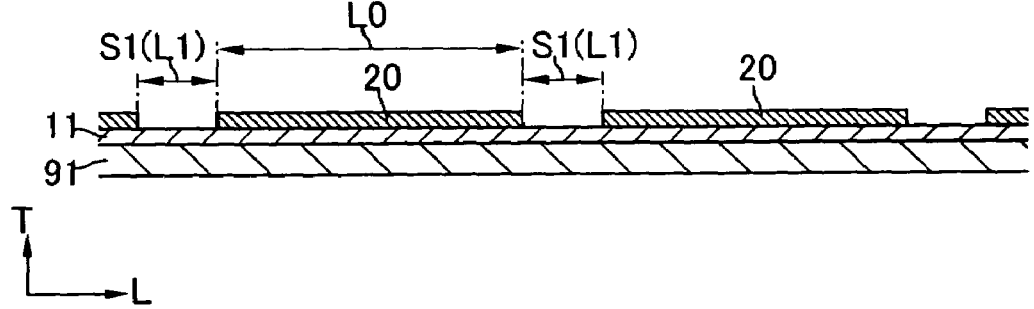
FIG. 4 is a sectional view taken along line 4-4 of FIG. 3.

FIG. 3 is a plan view of a first ceramic green sheet 11, and FIG. 4 is a sectional view taken along line 4-4 of FIG. 3. Referring to FIGS. 3 and 4, the first ceramic green sheet 11 (unbaked ceramic green sheet) is adhered to one surface of a carrier 91. The first ceramic green sheet 11 may be made of a ceramic paste being a mixture of ceramic powder, a solvent and a binder and have a uniform thickness. For example, the thickness of the first ceramic green sheet 11 may be 1.5 μm. The carrier 91 may be made of a suitable flexible plastic film.

TABLE 4

| Sample No. | Number of Internal Electrodes | Thickness T1 (μm) | Thickness T2 (μm) | T1/T2 | Thickness of Exterior (μm) | Distance Da (μm) | Distance Db (μm) | Db/Da | Barrel Distortion | Occurrence Ratio of Improper Mounting (ppm) | Occurrence Ratio of Delamination (%) |
|---|---|---|---|---|---|---|---|---|---|---|---|
| 16 | 400 | 1.0 | 5.0 | 0.20 | 100 | 100 | 115 | 1.15 | 1 | 10 | 0.0 |
| 17 | 400 | 1.0 | 2.5 | 0.40 | 100 | 100 | 145 | 1.45 | 3 | 20 | 0.0 |
| 18 | 400 | 1.0 | 1.5 | 0.67 | 100 | 100 | 190 | 1.90 | 7 | 40 | 0.2 |
| 19 | 400 | 1.0 | 1.0 | 1.00 | 100 | 100 | 240 | 2.40 | 11 | 100 | 0.5 |
| 20 | 400 | 1.0 | 0.5 | 2.00 | 100 | 100 | 550 | 5.50 | 17 | 700 | 1.0 |

From Table 4, it is seen that if the ratio Db/Da is equal to or less than 2.10, the occurrence ratio of improper mounting can be held below 50 ppm. The occurrence ratio of delamination can also be held below 0.3%.

On the other hand, if the ratio Db/Da exceeds 2.10, the occurrence ratio of improper mounting exceeds 50 ppm and increases sharply. The occurrence ratio of delamination also exceeds 0.3% and increases sharply. For instance, when the ratio Db/Da was 2.40, the occurrence ratio of improper Then, as shown in FIGS. 3 and 4, a plurality of internal electrode layers 20 are formed on one surface of the first ceramic green sheet 11. On the first ceramic green sheet 11, these internal electrode layers 20 are spaced apart from each other in the length direction L with regions S1 therebetween and also spaced apart from each other in the width direction W with regions S2 therebetween. Specifically, the individual internal electrode layers 20 are of a rectangular shape with a length L0 along the length direction L and a width W0 along the width direction W. For example, the length L0 may be 6.0 mm and the width W0 may be 1.2 mm. These internal electrode layers 20 are arranged in a matrix array along the length direction Y and the width direction W. The regions S1 are strip-shaped regions extending along the width direction W. For example, the regions S1 have a width L1 of 0.4 mm along the length direction L. On the other hand, the regions S2 are strip-shaped regions extending along the length direction L. For example, the regions S2 have a width W2 of 0.4 mm along the width direction W.

The internal electrode layers 20 may be formed by printing a conductive paste in a given pattern, wherein the conductive paste may be a mixture of conductive powder, a solvent and a binder. Examples of printing methods include screen printing, gravure printing and offset printing. The layer thickness of the internal electrode layer 20 is the same as described above.

Figure 5:
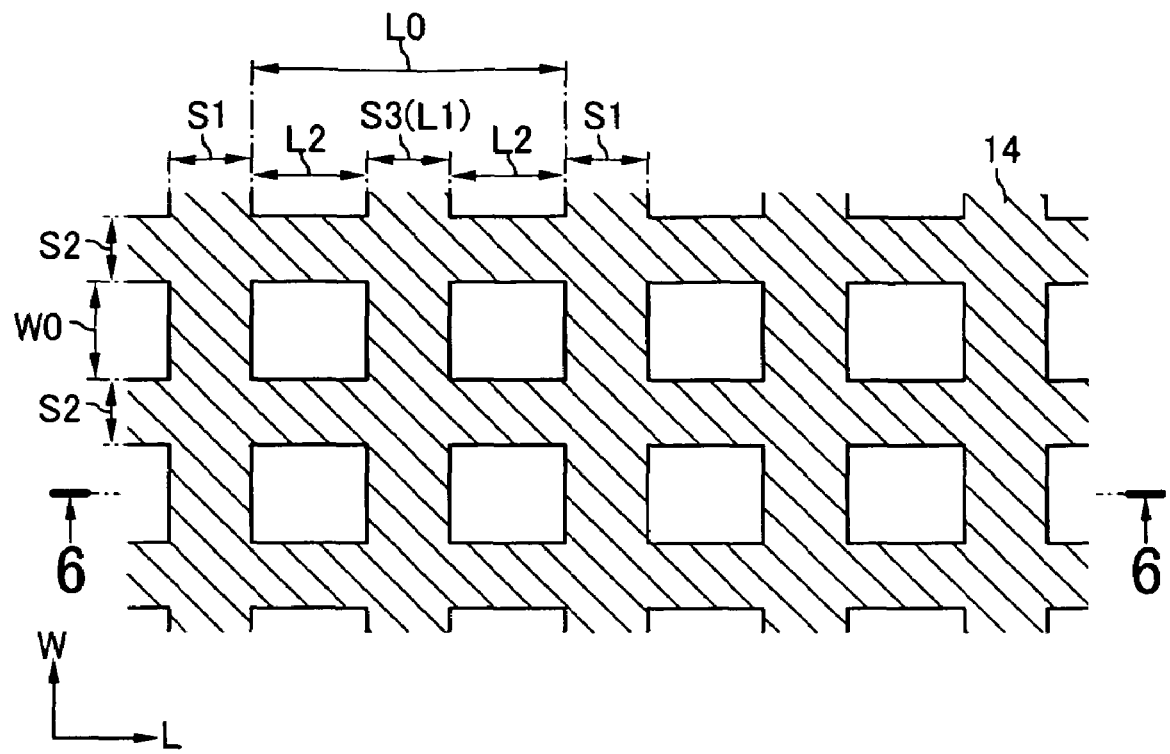
FIG. 5 is a plan view of a second ceramic green sheet employed in a method for manufacturing a laminated ceramic capacitor according to one embodiment of the present invention.
Figure 6:
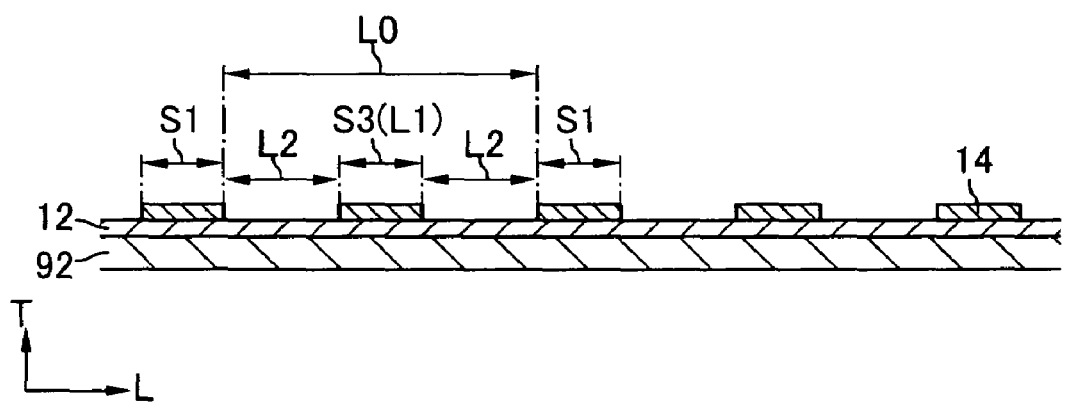
FIG. 6 is a sectional view taken along line 6-6 of FIG. 5.

FIG. 5 is a plan view of a second ceramic green sheet 12, and FIG. 6 is a sectional view taken along line 6-6 of FIG. 5. Referring to FIGS. 5 and 6, the second ceramic green sheet 12 is adhered to one surface of a carrier 92. The second ceramic green sheet 12 may be made of the same ceramic paste as the first ceramic green sheet 11 and have a uniform thickness. For example, the thickness of the second ceramic green sheet 12 may be 1.5 μm.

Then, as shown in FIGS. 5 and 6, a step absorbing layer 14 is formed on one surface of the second ceramic green sheet 12. The step absorbing layer 14 is formed in a pattern including the regions S1 and S2 shown in FIGS. 3 and 4, and additional regions S3. The additional regions S3 are strip-shaped regions extending along the width direction W and alternating with the regions S1 in the length direction L. The regions S3 have the same width L1 as the regions S1. For example, the distance L2 between the regions S1, S3 may be 2.8 mm.

The step absorbing layer 14 may be formed by printing a ceramic paste in a given pattern. Examples of printing methods include screen printing, gravure printing and offset printing. Basically, the step absorbing layer 14 may be made of a ceramic paste having the same composition as the second ceramic green sheet 12.

The layer thickness of the step absorbing layer 14 will be determined in consideration of various parameters in the manufacturing process of the laminated ceramic capacitor, e.g., the number of the second ceramic green sheets, the number of the internal electrode layers, and the layer thickness of the internal electrode layer. For example, when the number of the second ceramic green sheets is 40, the number of the internal electrode layers is 400, and the layer thickness of the internal electrode layer is 1.0 μm, the layer thickness of the step absorbing layer may be 3.0 μm.

The first ceramic green sheet 11 shown in FIGS. 3 and 4 and the second ceramic green sheet 12 shown in FIGS. 5 and 6 may be formed in any order. That is, the formation of the first ceramic green sheet 11 may be carried out before, after, or at the same time as the formation of the second ceramic green sheet 12.

Figure 7:
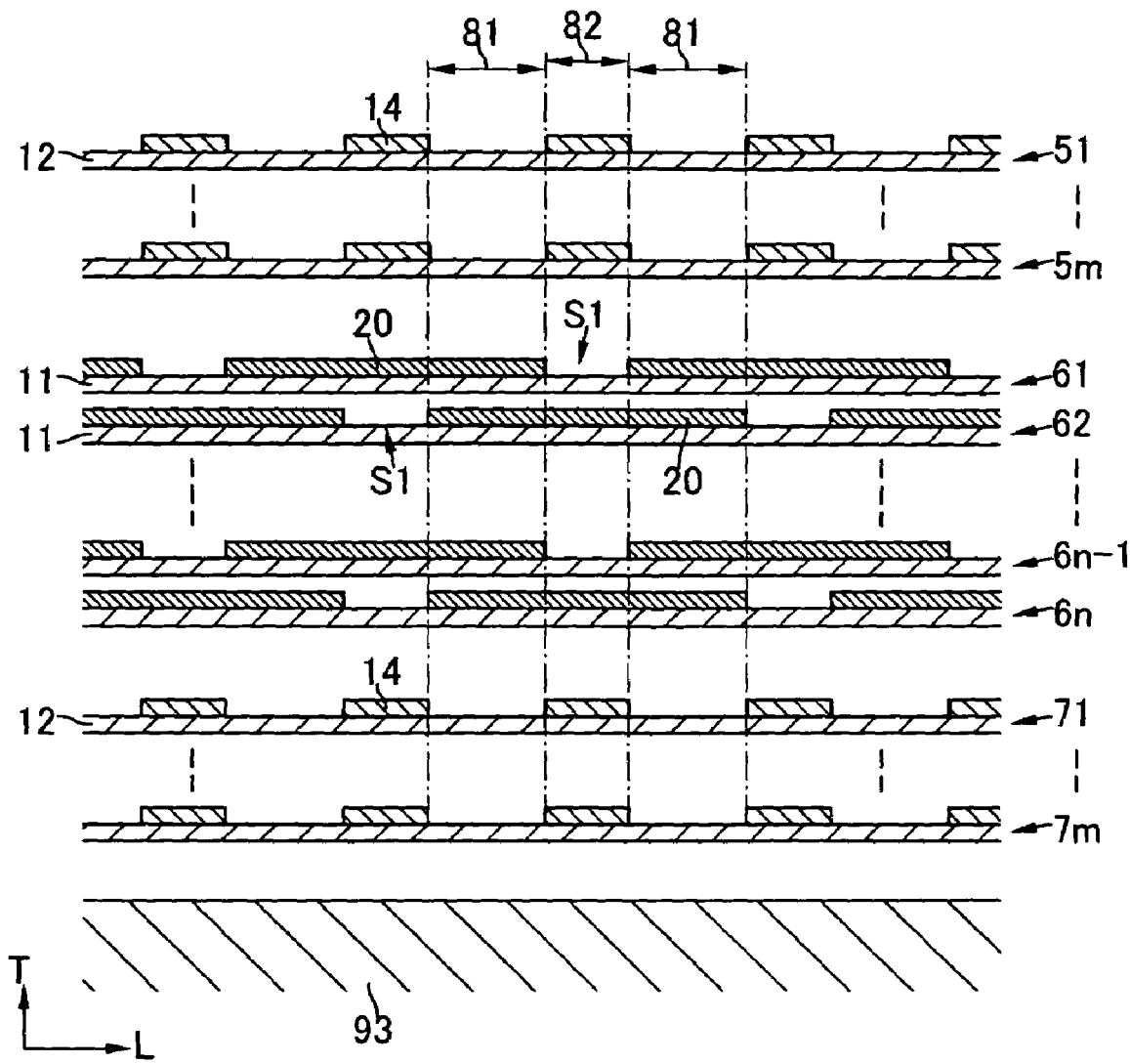
FIG. 7 is an explanatory diagram showing a step of stacking the first and second ceramic green sheets into a sheet stack.

Next, as shown in FIG. 7, there is formed a sheet stack having at least one second ceramic green sheet 12 outside a plurality of first ceramic green sheets 11. Specifically, the sheet stack has a unit layer 61-6n of the first ceramic green sheets 11 and upper and lower unit layers 51-5m, 71-7m of the second ceramic green sheets 12. The upper and lower unit layers 51-5m, 71-7m are located above and below the unit layer 61-6n in the lamination direction T.

Upon formation of the unit layer 61-6n, the first ceramic green sheets 11 are staggered in the length direction L. Specifically, the first ceramic green sheets 11 are arranged such that the unit layer 61-6n has first locations 81 where the internal electrode layers 20 are stacked one over another without the regions S1 in the lamination direction T and second locations 82 where the internal electrode layers 20 and the regions S1 alternate with each other in the lamination direction T. More specifically, opposite end portions of the internal electrode layer 20 in the length direction L lie in the first locations 81, while a center portion of the internal electrode layer 20 in the length direction L lies in the second location 82.

The upper unit layer 51-5m is located on the unit layer 61-6n with respect to the length direction L and the width direction W. With respect to the length direction L, specifically, the upper unit layer 51-5m is located such that the step absorbing layer 14 coincide with the second locations 82. With respect to the width direction W, on the other hand, the upper unit layer 51-5m is located such that the step absorbing layer 14 coincide with the regions S2 between the internal electrode layers 20 (see FIG. 3).

The lower unit layer 71-7m is also located on the unit layer 61-6n with respect to the length direction L and the width direction W. The details are the same as described for the upper unit layer 51-5m, and therefore, a duplicate description will be omitted.

In the illustrated embodiment, the sheet stack is formed by preparing the first ceramic green sheets 11 as the unit layer 61-6n, preparing the second ceramic green sheets 12 as the unit layers 51-5m, 71-7m, and then stacking the unit layers 51-5m, 61-6n, 71-7m one by one on a laminating table 93. However, the present invention should not be limited to the above process. For example, the sheet stack may be formed by preparing a primary stack of unit layers 51-5m, a primary stack of unit layers 61-6n, and a primary stack of unit layers 71-7m, and then staking the primary stacks. It is also possible to repeat the process of forming a ceramic green sheet and the process of printing internal electrode layers or a step absorbing layer until the sheet stack is obtained on a flexible carrier.

Subsequently, the obtained sheet stack is pressed and cut into a chip size. Thus, there is obtained a laminated green chip. The laminated green chip is then subjected to binder removal treatment and burning and formed with the terminal electrodes to obtain the laminate ceramic capacitor shown in FIGS. 1 and 2.

In the foregoing laminate ceramic capacitor manufacturing method, as shown in FIGS. 3 and 4, a plurality of the internal electrode layers 20 are formed on one surface of the first ceramic green sheet 11 with the regions S1 therebetween. In addition, as shown in FIG. 7, a plurality of the first ceramic green sheets 11 are stacked into a sheet stack. This provides the basic structure of the laminated ceramic capacitor.

In the foregoing laminate ceramic capacitor manufacturing method, the improvement resides in that at least one second ceramic green sheet 12, which is formed with the step absorbing layer 14 on one surface thereof but not formed with any internal electrode layer, as shown in FIGS. 5 and 6, is disposed outside the plurality of first ceramic green sheets 11 such that the step absorbing layer 14 is at the second locations 82 where the internal electrode layers 20 and the regions S1 alternate with each other in the lamination direction T.

This step absorbing structure can absorb steps which otherwise would be created between the second locations 82 where the internal electrode layers 20 and the regions S1 alternate with each other in the lamination direction T and the first location 81 where the internal electrode layers 20 are stacked one over another without the regions S1 in the lamination direction T, minimizing dimensional distortion of a ceramic substrate that can be obtained by cutting the sheet stack. This further prevents improper mounting of the laminated ceramic capacitor.

Moreover, the step absorbing structure makes it unnecessary to provide the process of printing a ceramic paste around the internal electrode layers 20 on the first ceramic green sheet 11 for absorbing steps. Therefore, the manufacturing process of the laminated ceramic capacitor can be simplified.

Because it is made unnecessary to provide the process of printing a ceramic paste around the internal electrode layers 20 on the first ceramic green sheet 11 for absorbing steps, the problem of sheet attack can also be prevented.

In FIG. 7, the second ceramic green sheets 12 are provided on both sides of the sheet stack of the first ceramic green sheets 11 as upper and lower outermost layers. However, the present invention should not be limited to the above arrangement. In this regard, it will be appreciated that the same effects and advantages can be obtained even if the second ceramic green sheets 12 are provided only below the sheet stack of the first ceramic green sheets 11.

Also in FIG. 7, a plurality of the second ceramic green sheets 12 are provided on both sides of the sheet stack of the first ceramic green sheets 11. However, the present invention should not be limited to the above arrangement. In this regard, it will be appreciated that the basic effects and advantages can be obtained even with only one second ceramic green sheet 12.

While the present invention has been particularly shown and described with reference to embodiments thereof, it will be understood by those skilled in the art that various changes in form and detail may be made therein without departing from the spirit, scope and teaching of the invention.

What is claimed is:

1. A laminated ceramic capacitor comprising:
a ceramic substrate being of a shape defined by length, width and thickness directions, and
a plurality of internal electrodes stacked one over another within said ceramic substrate at spaced intervals in the thickness direction and alternately led out to opposite ends of said ceramic substrate in the length direction,
said ceramic substrate having opposite surfaces in the thickness direction, one of which is planar,
wherein $1 < D_b/D_a \leqq 2.1$
where $D_a$ represents a distance between said planar surface and an outermost internal electrode at a center between said opposite ends of said ceramic substrate, and $D_b$ represents a distance between said planar surface and said outermost internal electrode at one of said opposite ends of said ceramic substrate.

2. A method for manufacturing a laminated ceramic capacitor, comprising:
forming a first ceramic green sheet having a plurality of internal electrode layers on one surface thereof with spaces between the internal electrode layers,
forming a second ceramic green sheet without any internal electrode layer, said second ceramic green sheet having a step absorbing layer on one surface thereof, and
forming a sheet stack with at least one said second ceramic green sheet disposed outside a plurality of said first ceramic green sheets such that said step absorbing layer is at locations where said internal electrode layers and said spaces alternate with each other in a direction of lamination.

* * * * *